US010114953B2

(12) United States Patent
Lu et al.

(10) Patent No.: US 10,114,953 B2
(45) Date of Patent: Oct. 30, 2018

(54) METHOD AND SYSTEM FOR UPGRADING FIRMWARE OF A CARD READER

(75) Inventors: Zhou Lu, Beijing (CN); Huazhang Yu, Beijing (CN)

(73) Assignee: FEITIAN TECHNOLOGIES CO. LTD., Beijing (CN)

( * ) Notice: Subject to any disclaimer, the term of this patent is extended or adjusted under 35 U.S.C. 154(b) by 1134 days.

(21) Appl. No.: 12/455,637

(22) Filed: Jun. 4, 2009

(65) Prior Publication Data

US 2010/0058309 A1    Mar. 4, 2010

(30) Foreign Application Priority Data

Aug. 28, 2008   (CN) .......................... 2008 1 0119072

(51) Int. Cl.
*G06F 9/44* (2018.01)
*G06F 21/57* (2013.01)

(52) U.S. Cl.
CPC .................. *G06F 21/572* (2013.01)

(58) Field of Classification Search
CPC .............................. G06F 21/00; G06F 21/572
USPC .............................................. 726/22
See application file for complete search history.

(56) References Cited

U.S. PATENT DOCUMENTS

| | | | | |
|---|---|---|---|---|
| 6,049,612 A * | 4/2000 | Fielder | ................. | H04L 9/0869 380/44 |
| 6,223,984 B1 * | 5/2001 | Renner | ................ | G06K 7/0008 235/380 |
| 6,726,100 B2 * | 4/2004 | Lauper | ............... | G06Q 20/4033 235/380 |
| 7,057,492 B2 * | 6/2006 | Jackson | ............... | G06K 7/0008 340/5.61 |
| 7,089,547 B2 * | 8/2006 | Goodman et al. | ............ | 717/168 |

(Continued)

FOREIGN PATENT DOCUMENTS

| EP | 1022638 A2 | 1/2000 |
|---|---|---|
| EP | 1256865 A2 | 5/2002 |

(Continued)

OTHER PUBLICATIONS

English translation of European Search Report dated May 26, 2010 corresponding to European Patent App. No. 09163744.7-2212 / 2159728, 6 pp.

(Continued)

*Primary Examiner* — Alexis M Casey
(74) *Attorney, Agent, or Firm* — Ohlandt, Greeley, Ruggiero & Perle, LLP

(57) ABSTRACT

The invention discloses a method and a system of upgrading firmware of a card reader. In the method, a card reader is connected to an IC card; the card reader determines whether the IC card is an IC card for upgrading, if it is, the card reader makes one-way or mutual authentication with the IC card; after a successful authentication, the card reader acquires files for upgrading the firmware of the card reader. The system includes a card reader and an IC card. The firmware of card reader is upgraded in the invention by acquiring the files for upgrading from an IC card in which the files for upgrading are pre-stored. The invention improves the efficiency of upgrading the card reader and also improves the security of the upgrading by the authentication between the card reader and the IC card.

4 Claims, 5 Drawing Sheets

(56) References Cited

U.S. PATENT DOCUMENTS

| | | | |
|---|---|---|---|
| 7,124,943 B2* | 10/2006 | Quan | G06F 8/65 235/451 |
| 7,558,804 B1* | 7/2009 | Polydov | |
| 7,614,087 B2* | 11/2009 | Nakano | G06F 21/10 726/27 |
| 7,676,803 B2* | 3/2010 | Zhao et al. | 717/168 |
| 7,904,895 B1* | 3/2011 | Cassapakis et al. | 717/168 |
| 7,934,209 B2* | 4/2011 | Zimmer et al. | 717/168 |
| 8,436,716 B2* | 5/2013 | Koo | G06F 8/65 340/10.1 |
| 8,910,868 B1* | 12/2014 | Wade | G06K 7/0095 235/449 |
| 8,949,608 B2* | 2/2015 | Hoornaert | E21B 41/0042 235/380 |
| 9,009,357 B2* | 4/2015 | Asnaashari | G06F 3/0605 710/8 |
| 2001/0054148 A1* | 12/2001 | Hoornaert | E21B 41/0042 713/172 |
| 2002/0093426 A1* | 7/2002 | Jackson | G06K 7/0008 340/572.7 |
| 2003/0034389 A1* | 2/2003 | Cantini | G07F 7/08 235/380 |
| 2003/0066062 A1* | 4/2003 | Brannock et al. | 717/169 |
| 2003/0191955 A1* | 10/2003 | Wagner | G06F 21/572 713/191 |
| 2005/0086497 A1* | 4/2005 | Nakayama | G06F 21/32 713/185 |
| 2005/0144612 A1* | 6/2005 | Wang et al. | 717/168 |
| 2006/0039564 A1* | 2/2006 | Rao | 380/270 |
| 2006/0065730 A1* | 3/2006 | Quan | G06F 8/65 235/451 |
| 2007/0104054 A1* | 5/2007 | Senshu | 369/47.12 |
| 2007/0168571 A1* | 7/2007 | Ramsey et al. | 710/8 |
| 2008/0016351 A1* | 1/2008 | Fontana | G06Q 20/388 713/169 |
| 2008/0052728 A1* | 2/2008 | Steinmetz et al. | 719/313 |
| 2008/0116271 A1* | 5/2008 | Holz | G06K 7/0004 235/435 |
| 2009/0055512 A1* | 2/2009 | Hodson et al. | 709/219 |
| 2009/0077634 A1* | 3/2009 | Hung | 726/4 |
| 2009/0083725 A1* | 3/2009 | Wang | 717/168 |
| 2009/0198618 A1* | 8/2009 | Chan et al. | 705/66 |

FOREIGN PATENT DOCUMENTS

| | | | |
|---|---|---|---|
| EP | 1647917 A2 | 9/2005 | |
| EP | 1647917 A2 * | 4/2006 | G06F 8/65 |
| JP | 2005215796 A | 8/2005 | |

OTHER PUBLICATIONS

English translation of European Office Action dated Jun. 9, 2011 corresponding to European Patent App. No. 09163744.7-2212, 5 pp.

* cited by examiner

METHOD AND SYSTEM FOR UPGRADING FIRMWARE OF A CARD READER

This application claims priority to the Chinese patent application No. 200810119072.2 submitted with the Chinese patent office on Aug. 28, 2008, the contents of which are incorporated herein in its entirety.

FIELD OF THE INVENTION

The invention relates to the field of smart card, particularly to a method and system of upgrading firmware of a card reader.

BACKGROUND OF THE INVENTION

Firmware, generally speaking, is a kind of software stored in an EROM (Erasable Read Only Memory) or an EPROM (Erasable Programmable Read-Only Memory) and etc. Program stored in firmware is hard to be read or changed by a terminal user since they are stored in the read-only memories, that is, firmware is hard or impossible to be changed by the terminal user. Therefore if an error happened inside the firmware or if the firmware needs to be upgraded, the EROM or EPROM for storing it must be replaced by a professional person, which is hard to execute.

With the development in the IT industry, new meanings are brought to firmware. Generally, firmware refers to the most fundamental software in a system. Firmware in a system uses a Flash for storing it, which has the advantage of supporting the functions of booting and upgrading.

However, the commonly used method of upgrading firmware of a card reader is executed by a special device or software. Through deep analysis, the inventor finds the disadvantages in the prior art as follows.

The method of upgrading firmware of a card reader by software, executed by running a preset program for upgrading in a computer, needs the files for upgrading, such as software or bin files, from a terminal user, which brings about the risks of security. The method of upgrading firmware of a card reader by a special device may result in a high cost in developing and the difficulty in operating the device.

SUMMARY OF THE INVENTION

In order to improve the efficiency of upgrading firmware of a card reader while ensuring security, some embodiments of the invention provide a method and system of upgrading firmware of a card reader, an IC card and a card reader thereof. The solutions are as follows.

According to an embodiment of the invention, a method of upgrading firmware of a card reader may include the following steps of:

establishing a connection between the card reader being and an IC card;

determining, by the card reader, whether the IC card is an IC card for upgrading in which files for upgrading are stored;

if it is, making mutual or one-way authentication by the card reader with the IC card; otherwise, operating, by the card reader, the IC card as normal;

after a successful authentication between the card reader and the IC card, acquiring, by the card reader, files for upgrading from the IC card, and upgrading the firmware of the card reader by using the acquired files for upgrading.

The step of making mutual or one-way authentication by the card reader with the IC card may include a step of:
authenticating the IC card by the card reader.

Accordingly, the step of acquiring by the card reader the files for upgrading from the IC card after a successful authentication between the card reader and the IC card may include: acquiring, by the card reader, the files for upgrading from the IC card after the card reader succeeds in authenticating the IC card.

The step of making mutual or one-way authentication by the card reader with the IC card may further include a step of authenticating the card reader by the IC card.

Accordingly, the step of acquiring by the card reader the files of upgrading from the IC card after a successful authentication between the card reader and the IC card may include: acquiring, by the card reader, the files of upgrading from the IC card after the card reader succeeds in authenticating the IC card and the IC card succeeds in authenticating the card reader.

The step of acquiring by the card reader the files for upgrading from the IC card may include: acquiring by the card reader the files for upgrading from the IC card according to a preset address corresponding to the files for upgrading.

The files for upgrading stored in the IC card are encrypted files for upgrading;

Accordingly, the step of acquiring by the card reader the files for upgrading from the IC card may include: acquiring, by the card reader, the encrypted files for upgrading and decrypting the encrypted files for upgrading.

Before the step of upgrading the firmware of the card reader by using the files for upgrading, the method may further includes a step of determining by the card reader whether the files for upgrading are valid, if they are, upgrading the firmware of the card reader by using the files for upgrading.

The step of determining by the card reader whether the files for upgrading are valid may include: determining, by the card reader, whether the files for upgrading are valid according to a checksum of the files for upgrading.

If the IC card is a contacting IC card and the card reader is a contacting card reader, the step of determining by the card reader whether the IC card is an IC card for upgrading is stored may include:

sending by the card reader an inspection instruction to the IC card, and reading an inspection answer returned by the IC card, and determining whether data in the inspection answer matches preset data, if it does, determining that the IC card is an IC card for upgrading, otherwise, determining that the IC card is not an IC card for upgrading; or reading by the card reader feature information sent by the IC card, and determining whether the feature information matches preset feature information, if it does, determining that the IC card is an IC card for upgrading, otherwise, determining that the IC card is not an IC card for upgrading.

If the IC card is a contacting IC card and the card reader is contacting card reader, the step of authenticating the IC card by the card reader may include:

generating, by the card reader, a first validation code and sending the first validation code to the IC card; generating a first verification code according to the first validation code; and reading a first authorization code generated according to the first validation card by the IC card; and determining whether the first verification code matches the first authorization code, if it is, determining that the card reader succeeds in authenticating the IC card, otherwise, determining that the card reader fails in authenticating the IC card.

The step of generating the first verification code according to the first validation code by the card reader may include one of the following:

using, by the card reader, the first validation code as the first verification code directly; or converting, by the card reader, the first validation code to obtain the first verification code; or encrypting, by the card reader, the first validation code with a pair of preset symmetrical keys to obtain the first verification code; or encrypting, by the card reader, the first validation code with a preset asymmetrical key to obtain the first verification code.

If the IC card is a contacting IC card and the card reader is a contacting card reader, the step of authenticating the card reader by the IC card may include:

reading, by the card reader, a second validation code generated by the IC card, and generating a second authorization code according to the second validation code and sending the second authorization code to the IC card;

reading, by the card reader, status information returned by the IC card, and determining whether the status information is preset information, if it is, determining that the IC card succeeds in authenticating the card reader; otherwise, determining that the IC card fails in authenticating the card reader.

If the IC card is a contactless IC card and the card reader is a contactless card reader, the step of determining whether the IC card is an IC card for upgrading may include:

determining, by the card reader, whether an identification returned by the IC card matches a preset identification for the IC card for upgrading, if it does, determining by the card reader that the IC card is an IC card for upgrading, otherwise, determining by the card reader that the IC card is not an IC card for upgrading.

Accordingly, the step of authenticating the IC card by the card reader may include:

reading, by the card reader, status information returned by the IC card, and determining whether the status information matches preset information, if yes, determining that the card reader succeeds in authenticating the IC card; otherwise, determining that the card reader fails in authenticating the IC card.

According to another embodiment of the invention, a system of upgrading firmware of a card reader may include a card reader and an IC card;

the card reader is adapted to establish a connection to an IC card, and determine whether the IC card is an IC card for upgrading, and if it is, make mutual or one-way authentication with the IC card; otherwise, operate the IC card as normal; after a successful authentication, the card reader is further adapted to acquire files for upgrading from the IC card and upgrade its firmware by using the files for upgrading; the card reader includes: an interface module adapted to be connected to the IC card; a determining module adapted to determine the IC card connected to the interface module is an IC card for upgrading in which files for upgrading is stored; an authentication module adapted to make mutual or one-way authentication with the IC card if the determining module determines that the IC card is an IC card for upgrading; an operation module adapted to operate the IC card as normal if the determining module determines that the IC card is not an IC card for upgrading; and an acquiring module adapted to acquire files for upgrading from the IC card connected to the card reader and upgrade the firmware of the card reader by using the files for upgrading after a successful authentication between the authentication module and IC card; and the IC card includes an interface module for connection to a card reader and an authentication module adapted to make mutual or one-way authentication with the card reader after the IC card is authenticated as the IC card for upgrading; the IC card is adapted to establish a connection to the card reader, and make mutual or one-way authentication with the card reader after the IC card is authenticated as the IC card for upgrading; the IC card is further adapted to send the files for upgrading to the card reader after a successful authentication between the IC card and the card reader;

The acquiring module may include an acquiring unit adapted to acquire the files for upgrading from the IC card according to a preset address in which the files for upgrading are stored, wherein the files for upgrading are used for upgrading the firmware of the card reader, after the authentication module succeeds in authenticating the IC card.

The acquiring module may further include a validation determining unit adapted to determine whether the files for upgrading are valid, and if yes, upgrade the firmware of the card reader with the file for upgrading.

The acquiring module may further include, if the acquired files for upgrading are encrypted files, a decryption unit adapted to decrypt the encrypted files for upgrading so as to upgrade the firmware of the card reader with the files for upgrading.

The authentication module of the IC card may include a first authentication unit adapted to store data needed by the card reader when authenticating the IC card, so as to be authenticated by the card reader after the card reader determining that the IC card is an IC card for upgrading.

The authentication module of the IC card may further include a second authentication unit adapted to authenticate the card reader.

The IC card may further include a storage module adapted to store the files for upgrading and an encryption module adapted to encrypt the files for upgrading stored in the storage module.

The interface module of the IC card may include a first interface unit adapted to mechanically connect to the card reader, and activate the IC card; or a second interface unit adapted to send an identification of the IC card to the card reader according to a card-searching instruction and an anti-collision instruction transmitted from the card reader, to establish the connection between the IC card and the card reader.

The first authentication unit may include a first authentication subunit adapted to receive a first validation code generated and sent by the card reader; and generate a first authorization code, which is used when the IC card is authenticated by the card reader, according to the first validation code and send the first authorization code to the card reader; or a second authentication subunit adapted to return status information, used when the IC card is authenticated by the card reader, to the card reader.

The second authentication unit may include a third authentication subunit adapted to generate a second validation code and send the second validation code to the card reader, and adapted to receive a second authorization code generated according to a second validation code and sent by the card reader and send to the card reader status information for determining by the card reader whether the IC card succeeds in authenticating the card reader.

Solutions provided in the embodiments of the invention, realized by upgrading firmware of a card reader with an IC card, in which bin files for upgrading is stored, have the advantages of short cycle for development, lower cost, convenience for operation, high efficiency for upgrading, and a higher security by an authentication between the card reader and the IC card, and the convenience due to the using of a portable IC card in small size.

BRIEF DESCRIPTION OF THE DRAWINGS

For further description of solutions of the embodiments of the invention, brief description of drawings of the embodiments of the invention is provided below, according to which other drawings can be made out by persons in the art.

DETAILED DESCRIPTION OF THE EMBODIMENTS

In order to make clear of the purpose, solution and advantages of the invention, a further description of some embodiments of the invention is given in conjunction with drawings of the invention as follows. In the following embodiments, the card reader is connected to the host for an example.

Figure 1:
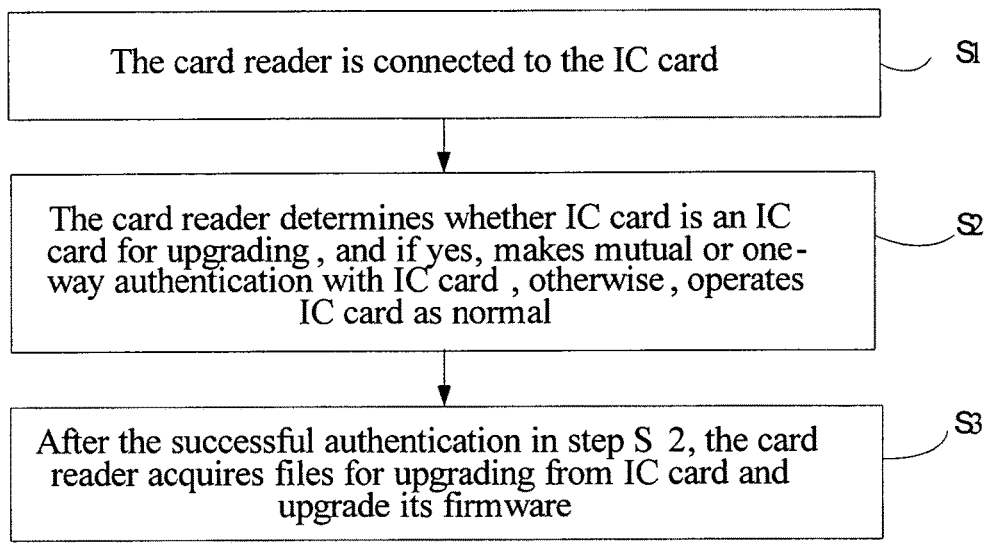
FIG. 1 is a flow chart of a method of upgrading firmware of a card reader in an embodiment of the invention.

In order to solve problems that upgrading a firmware of a card reader needs a special device with high cost, complex operation, and in order to take the advantages of high efficiency and security of the upgrading, an embodiment of method of upgrading firmware of a card reader of the invention as shown in FIG. 1 is provided as follows.

S1. A connection is established between the card reader and an IC (Integrated Circuit) card;

S2. The card reader determines whether the IC card being connected to it is an IC card for upgrading in which upgrading files are stored; if it is, the card reader makes mutual or one-way authentication with the IC card for upgrading; otherwise, the card reader operates the IC card as normal;

S3. After the card reader succeeds in making mutual or one-way authentication with the IC card, it acquires files for upgrading from the IC card, and uses the files to upgrade the firmware of the card reader.

In step S2, the step that the card reader makes mutual or one-way authentication with the IC card for upgrading may include a step that the card reader authenticates the IC card for upgrading.

Accordingly, the step that the card reader succeeds in making mutual or one-way authentication with the IC card for upgrading may include the step that the card reader succeeds in authenticating the IC card.

Alternatively, in step S2, the step that the card reader makes mutual or one-way authentication with the IC card for upgrading may include the steps that the card reader authenticates the IC card for upgrading and the IC card for upgrading authenticates the card reader.

Accordingly, in step S3, the step that the card reader succeeds in making mutual or one-way authentication with the IC card for upgrading may include the steps that the card reader succeeds in authenticating the IC card and the IC card succeeds in authenticating the card reader.

After the step that the card reader acquires the files for upgrading from the IC card for upgrading in the step S3, a further step may include that the card reader determines whether the files for upgrading are valid, and if they are, the card reader upgrades the firmware of the card reader with the files for upgrading.

In order to further detail the method of the invention, five further embodiments are given blow. Persons in the art will recognize that there are two types of IC cards, contacting IC card and contactless IC card. In the following embodiment 1, a contacting IC card is taken an example, and therefore the card reader corresponding to it is a contacting IC card reader, and the authentication in step S2 is a mutual authentication between the card reader and the IC card. In the embodiment 2, the IC card is a contactless card, and therefore the card reader corresponding to it is a contactless IC card reader, and the authentication in step S2 is a one-way authentication in which the card reader authenticates the IC card.

Embodiment 1

Figure 2:
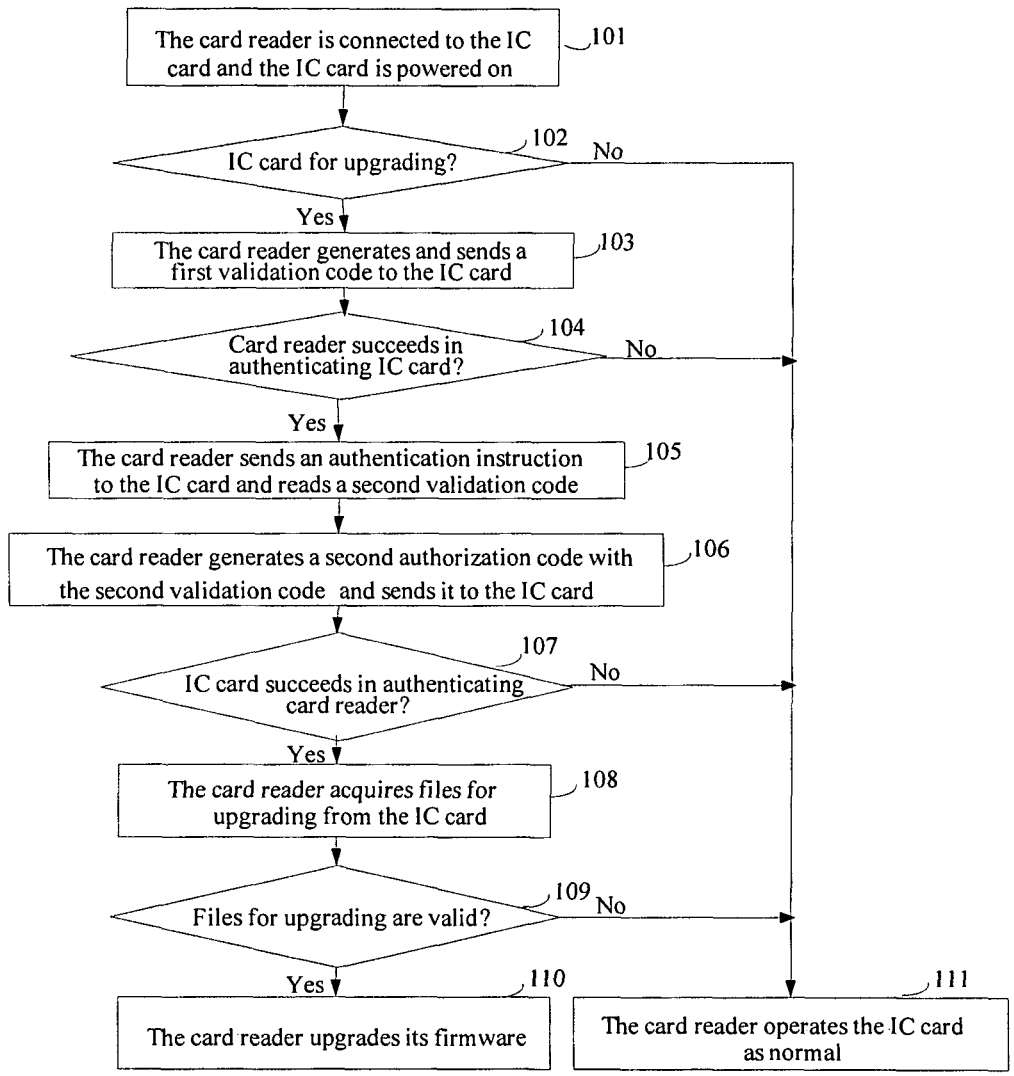
FIG. 2 is a flow chart of a method of upgrading firmware of a card reader in the embodiment 1 of the invention.

As shown in FIG. 2, a method of upgrading firmware of a card reader is provided in embodiment 1 of the invention, including the steps as follows.

In step 101, a card reader is connected to an IC card, and the IC card is powered on.

In the embodiment 1, a contacting IC card and a contacting card reader are applied, both of them comply with ISO7816 protocol. Also, because the IC card is connected to the card reader via mechanical contacting points, when the IC card is activated, the IC card is powered on. In step 101, a communication is established between the card reader and the IC card after the card reader is connected to the IC card, and the IC card is powered on.

In step 102, the card reader sends an inspection instruction to the IC card and reads a result returned from the IC card, and determines whether the IC card is an IC card for upgrading in according to the result, if it is, the processing proceeds to step 103; otherwise, the processing proceeds to step 111.

In the step 102, the inspection instruction sent by the card reader may be a self-defined APDU (Application Protocol Data Unit) instruction, such as 00850000080102030405060708, or may be any other appropriate instruction. In the embodiments of the invention, there is no limiting to the inspection instruction.

Moreover, in the embodiment 1, the step that the card reader determines whether the IC card is an IC card for upgrading may be implemented by one of the following two methods:

The card reader sends an inspection instruction to the IC card, and determines, according to an identification of the IC card contained in a result returned from the IC card, whether the identification of the IC card matches preset information, if it is, the card reader determines the IC card is an IC card for upgrading; otherwise, the card reader determines the IC card is not an IC card for upgrading; or The card reader determines whether feature information of the IC card, which may be an ATR (Answer To Reset) or any other self-defined identification, complies with a condition preset by the card reader, if it does, the card reader determines the IC card is an IC card for upgrading; otherwise, the card reader determines the IC card is not an IC card for upgrading;

In step 103, after the card reader determines the IC card is an IC card for upgrading, the card reader generates a first validation code and sends it to the IC card.

In this step, the first validation code is generated randomly. The first validation code may be a digit string or a character string. For convenience of the description, it is supposed that the first validation code generated by the card reader is 0102030405060708 in the embodiment 1.

In step 104, the card reader generates a first verification code according to the validation code, and reads a first authorization code generated by the IC card, and determines whether the first verification code matches the first authorization code, if it is, the card reader succeeds in authenticating the IC card, and step 105 is executed; otherwise, the processing proceeds to step 111.

In this step, the methods of the card reader for generating the first verification code according to the first validation code may include one of the followings:

the card reader uses the first validation code as the first verification code; or the card reader converts the first validation code with a preset method, such as order-reversing or order-changing according a preset rule, into the first verification code; or the card reader encrypts the first validation code with a preset symmetrical key to get the first verification code; or the card reader encrypts the first validation code with a public key acquired from the IC card to get the first verification code.

For convenience of description, in the embodiment 1, it is supposed that the first verification code is acquired by reversing the byte order of first validation code. For example, if the first validation code is 0102030405060708, the first verification code is 0807060504030201.

In this step, the authorization code is generated by the IC card according to the first validation code. The methods of generating the authorization code are the same as that of generating the first validation code.

However, the method of generating the first verification code according to the first validation code by the card reader may be different from that of generating the first authorization code according to the first validation code by the IC card.

For example, the card reader may generate the first verification code by encrypting the first validation code with 3DES (Triple Data Encryption Standard) algorithm, which is a standard algorithm for data encryption, while the IC card may generate the first authorization code with DES (Data Encryption Standard) algorithm. Therefore before the card reader compares the first validation code with the first authorization code, it must decrypt the first validation code and the first authorization code separately.

In the invention, the method of the card reader for generating a first verification code according to the first validation code, and the method of the IC card for generating a first authorization code according to the first validation code, and the method of the card reader for comparing the first verification code with the first authorization are not limited to any particular example described herein.

In step 105, the card reader sends an authentication instruction to the IC card, and reads the second validation code generated by the IC card.

The method of generating the second validation code by the IC card is the same as that of generating the first validation code by the card reader in step 104, and therefore no further description is given. The second validation code can be the same as or different from the first validation code. For convenience, it is supposed that the second validation code is 0102030405060708 in the embodiment 1.

In step 106, the card reader generates a second authorization code according to the second validation code and returns it to the IC card.

In this step, the method of generating the second authorization code by the card reader with the second validation code may be as one of the following: the second validation code is used as the second authorization code directly; or the second validation code is converted into the second authorization code by a preset method, such as order-reversing or order-changing according to a preset rule; or the second validation code is encrypted with a preset symmetrical key to get the second authorization code; or the second validation code is encrypted with an asymmetrical key preset in the IC card to get the second authorization code.

For convenience of description, it is supposed that the second authorization code is obtained from the second validation code directly by the card reader in the embodiment 1. For example, if the second validation code is 0102030405060708, the second authorization is 0102030405060708.

In step 107, the card reader reads information returned from the IC card, and determines whether the IC card succeeds in authenticating the card reader, if it is, the processing proceeds to step 108; otherwise, the processing proceeds to step 111.

After the card reader sends the second authorization code to the IC card in step 106, the IC card compares the second validation code with the second authorization code, if the codes match with each other, it may be determined that the IC card succeeds in authenticating the card reader; otherwise, it may be determined that that the IC card fails in authenticating the card reader.

After the IC card succeeds in authenticating the card reader, it sends to the card reader a result, such as a status byte, and the card reader determines whether the status byte is preset data, such as 0x9000, if it is, it may be determined that the IC card succeeds in authenticating the card reader; otherwise, it may be determined that the IC card fails in authenticating the card reader.

In step 108, the card reader acquires files for upgrading from the IC card.

In detail, the files for upgrading are files for upgrading the firmware of the card reader, and are stored in the IC card in forms of one or more files, such as file A, file B, file C, etc in different addresses. Furthermore, a file ID (identification) can be set for indexing each of the files for upgrading stored in the IC card.

In order to ensure the security of the files for upgrading, the files for upgrading can be encrypted with a preset key by using an encryption algorithm, such as 3DES, DES, AES (Advanced Encryption Standard) or DH (Diffie-Hellman), and the result encrypted is stored in IC card. Therefore the card reader needs to decrypt the encrypted result to get the files for upgrading.

In step 109, the card reader determines whether the files for upgrading are valid, if they are, the processing proceeds to step 110; otherwise, the processing proceeds to step 111.

In this step, the card reader may make the determination by using a checksum of the files for upgrading, which is a checksum acquired by XOR or CRC (Cyclic Redundancy Check) or the like.

In step 110, the card reader upgrades its firmware.

When upgrading its firmware, the card reader can choose to upgrade all or part of the firmware in it. If the card reader acquires the files for upgrading a control module of it, it upgrades the control module with the files for upgrading.

In step 111, the card reader does not upgrade its firmware, and operates the IC card as normal.

As shown in FIG. 1, the reasons for the card reader's failure to upgrade its firmware may include the following: the card reader determines the IC card is not the IC card for upgrading; or the card reader fails to authenticate the IC card for upgrading; or the IC card fails to authenticate the card reader; or the card reader determines the files for upgrading acquired are invalid.

The method provided in the embodiment 1 of the invention, realized by upgrading firmware of a card reader with an IC card in which bin files for upgrading are stored, has the advantages of short cycle for development, lower cost, convenience for operation, high efficiency for upgrading, and a higher security by an authentication between the card reader and the IC card, and the convenience due to utilization of a portable IC card in small size.

In this embodiment 1, both a contacting IC card and a contacting card reader are used as examples illustrating the upgrading of the firmware of the card reader. Differently, in the following embodiment 2, a contactless IC card and a contactless card reader are used to illustrate the upgrading of the firmware of the card reader.

Embodiment 2

Figure 3:
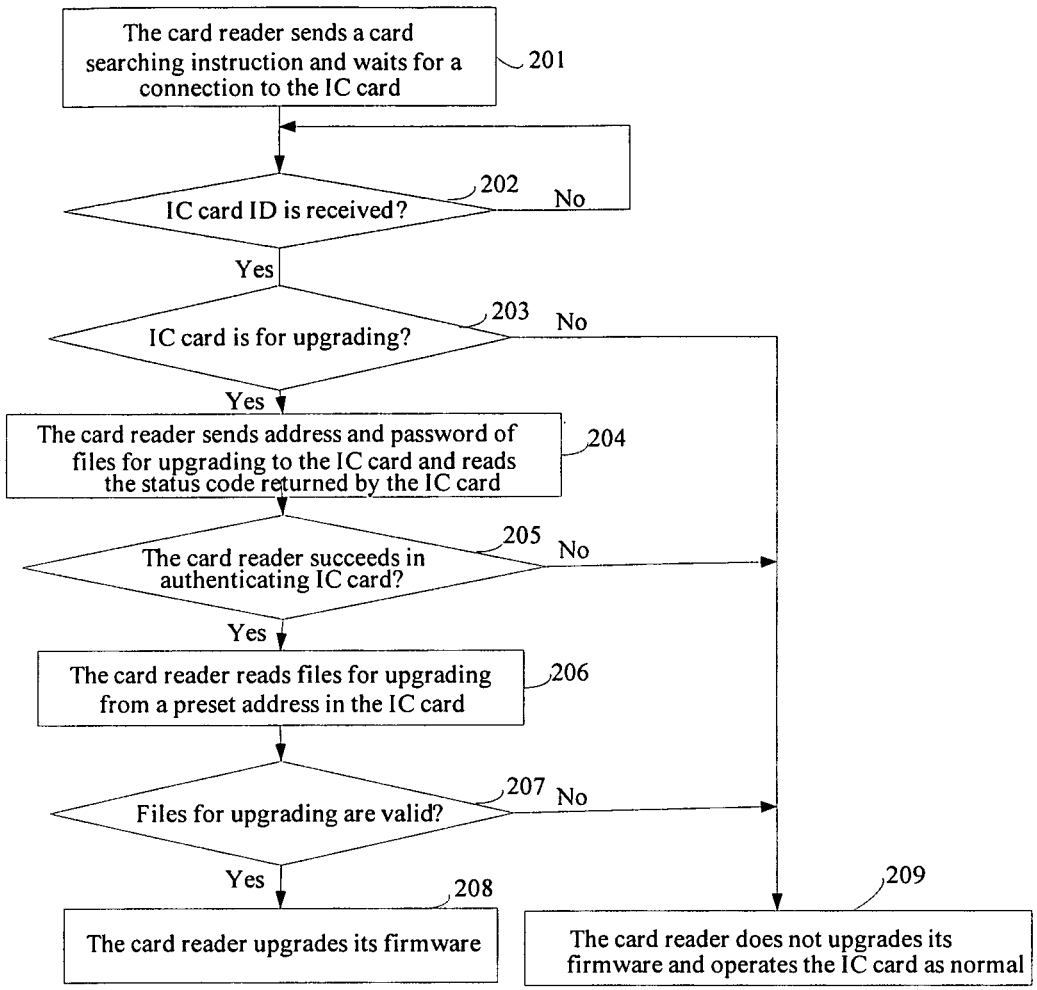
FIG. 3 is a flow chart of a method of upgrading firmware of a card reader in the embodiment 2 of the invention.

As shown in FIG. 3, a method of upgrading firmware of a card reader is provided in the embodiment 2 of the invention. The method may include the following steps.

In step 201, the card reader sends a card-searching instruction to the IC card for establishing a connection to the IC card.

In this embodiment 2, the card-searching instruction may be, for example, 0x26.

In step 202, the card reader sends an anti-collision instruction to the IC card, and determines whether the IC card identification is received, if it is received, it may be determined that there is not a collision with the IC card, and the processing proceeds to step 203; otherwise, it may be determined that there is a collision with the IC card and the card reader continues to wait for an identification of the IC card.

In this step, the anti-collision instruction sent by the card reader may be, for example, 93H 20H. After the card reader sends the anti-collision instruction to the IC card, it waits for receiving the identification of the IC card, which is unique for the IC card, such as a card number. In the embodiments of the invention, the identification of the IC card may be implemented in any appropriate manner and is not limited to what is described above.

In step 203, the card reader reads the identification returned by the IC card, and determines whether the IC card is an IC card for upgrading by the identification, if it is, step 204 is executed; otherwise, step 209 is executed.

In this step, the step of determining by the card reader whether the IC card is an IC card for upgrading may include the following steps:

The card reader compares the identification of the IC card with a preset identification stored in it, and if the identification of the IC card matches (for example, is the same as) the preset identification, determines that the IC card is an IC card for upgrading; otherwise, determines that the IC card is not an IC card for upgrading.

In step 204, the card reader sends a preset address and password of the files for upgrading to the IC card, and reads the status code, for authenticating the IC card, returned by the IC card.

In step 205, after the card reader reads the status code returned by the IC card, it determines whether the card reader succeeds in authenticating the IC card, if it does, step 206 is executed; otherwise, step 209 is executed.

The step that the card reader determines whether the card reader succeeds in authenticating the IC card may include the following:

The card reader determines whether the status code returned by the IC card matches a preset status code, such as 0x9000, stored in it, if it does, the card reader determines that it succeeds in authenticating the IC card; otherwise, the card reader determines that it fails to authenticate the IC card.

In step 206, the card reader reads the files for upgrading from a preset address, in which the files for upgrading are stored, in the IC card.

After the card reader determines that the IC card is an IC card for upgrading and it succeeds in authenticating the IC card, it acquires the files for upgrading from the IC card, which are stored in the IC card in forms of one or more files, such as file A, file B, file C, etc in different addresses. Furthermore, a file ID can be set for indexing each of the files for upgrading stored in the IC card.

In order to ensure the security of the files for upgrading, the files for upgrading can be encrypted with a preset key by using an encryption algorithm, such as 3DES☐DES☐AES or DH, and the result encrypted is stored in IC card. Therefore the card reader needs to decrypt the encrypted result to get the files for upgrading.

In step 207, the card reader determines whether the files for upgrading are valid, if it is, step 208 is executed; otherwise, step 209 is executed.

The determining step is executed by determining a checksum of the files for upgrading. For example, the card reader determines whether the files for upgrading are valid according to a checksum, such as an XOR or a CRC checksum, of the files.

In step 208, the card reader upgrades its firmware.

In this step, all or part of the firmware in the card reader can be upgraded as needed. For example, if the files for upgrading are for upgrading only the control module, the card reader upgrades only its control module.

In step 209, the firmware of the card reader can not be upgraded, and the card reader operates the IC card as normal.

As shown in FIG. 2, the reasons for the card reader's failure to upgrade its firmware may include the following: the card reader determines that the IC card is not an IC card for upgrading; or the card reader fails to authenticate the IC card for upgrading; or the card reader acquires invalid files for upgrading.

The method provided in the embodiments of the invention, realized by upgrading firmware of a card reader with an IC card, in which bin files for upgrading is stored, has the advantages of short cycle for development, lower cost, convenience for operation, high efficiency for upgrading, and a higher security by an authentication between the card reader and the IC card, and the convenience due to the using of a portable IC card in small size.

Embodiment 3

Figure 4:
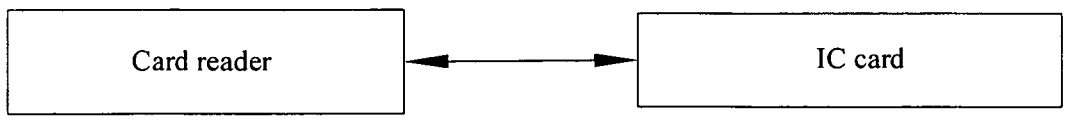
FIG. 4 is a schematic diagram of a system of upgrading firmware of a card reader in the embodiment 3 of the invention.

As shown in FIG. 4, a system for upgrading firmware of a card reader is provided. The system may include a card reader and an IC card.

The card reader is adapted to establish a connection to the IC card, and determine whether the IC card is an IC card for upgrading, if it is, make mutual or one-way authentication with the IC card; otherwise, determine the IC card is a common IC card and operate it as normal. After the authentication, the card reader is adapted to acquire files for upgrading from the IC card for upgrading and upgrade its firmware with the files for upgrading.

The IC card is adapted to establish a connection to the card reader, and make mutual or one-way authentication with the card reader after it is authenticated as an IC card for upgrading by the card reader. After the authentication, the IC card is adapted to send files for upgrading to the card reader.

The step that the card reader makes mutual or one-way authentication with the card reader may include the steps as follows:

the card reader authenticates the IC card for upgrading.

The step that the card reader makes mutual or one-way authentication with the card reader may further include: the IC card for upgrading authenticates the card reader.

Further, the card reader may be also adapted to determine whether the files for upgrading are valid. If they are, the card reader upgrades its firmware with the files for upgrading.

The IC card may be further adapted to encrypt the files for upgrading stored in it, and therefore the card reader may be further adapted to decrypt the encrypted files for upgrading acquired from the IC card.

Figure 5:
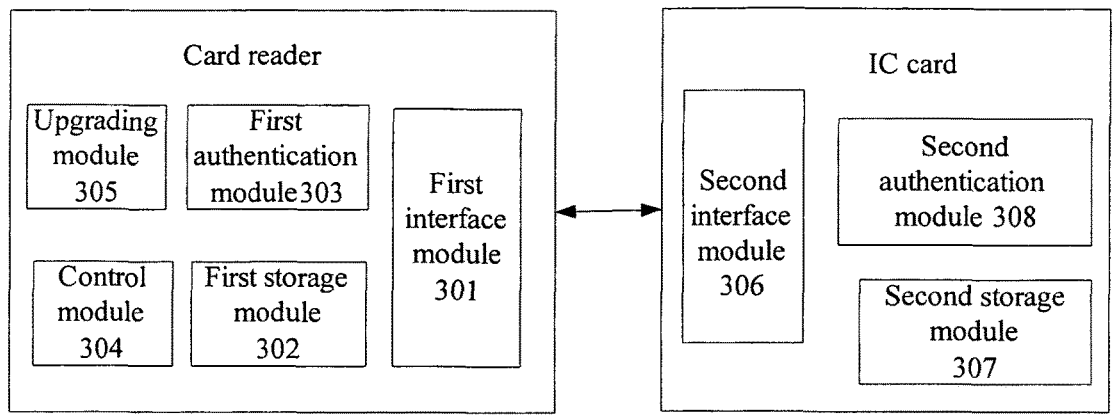
FIG. 5 is a more detailed diagram of a system of upgrading firmware of a card reader in the embodiment 3 of the invention.

In order to make the system in the embodiment 3 of the invention better understood, a detailed description is given as shown in FIG. 5. As shown in FIG. 5, the system may include a card reader and an Integrated Circuit (IC) card. The card reader may include a first interface module 301, a first storage module 302, a first authentication module 303, a control module 304 and an upgrading module 305. The IC card may include a second interface module 306, a second storage module 307, and a second authentication module 308.

The first interface module 301 is adapted to enable the communication between the card reader and the IC card. The information communicated between the IC card and the card reader may include a self-defined APDU instruction or the files for upgrading in the embodiment 3. The information communicated between the IC card and the card reader may further include standard authentication instructions and/or card-searching instructions and/or self-defined identification.

The first storage module 302 is adapted to store the data received and generated by the card reader.

The first authentication module 303 is adapted to determine whether the IC card is an IC card for upgrading, and/or whether the IC card matched the card reader, and/or whether the files for upgrading read by the card reader are valid.

The control module 304 is adapted to control other modules in the card reader.

The upgrading module 305 is adapted to eliminate the files for upgrading after the files for upgrading are read, and upgrade the firmware of the card reader. In practice, the files for upgrading may be used for upgrading only part of the modules of the card reader. In the embodiment 3 the files for upgrading are used for upgrading the control module. The card reader may further include an encryption/decryption module adapted to decrypt or encrypt the data read or generated by the card reader.

The second interface module 306 is also adapted to enable the communication between the card reader and the IC card.

The second storage module 307 is adapted to store the files for upgrading the firmware of the card reader or the data received from the card reader or the data generated by the IC card. In practice, the IC card may further include an encryption/decryption module adapted to encrypt/decrypt the data generated in the IC card or the data received from the card reader or the files for upgrading the firmware of the card reader. In the embodiment 3, the files for upgrading are stored in the second storage module 307 of the IC card with a preset file identification. In this invention, the files for upgrading may be encrypted files, stored in the second storage module 307 of the IC card, encrypted with a preset key by using an encryption algorithm, such as 3DES, DES, AES or DH.

The second authentication module 308 is adapted to determine whether the card reader matches the IC card.

The system provided in the embodiments of the invention, realized by upgrading firmware of a card reader with an IC card, in which bin files for upgrading is stored, has the advantages of short cycle for development, lower cost, convenience for operation, high efficiency for upgrading, and a higher security by an authentication between the card reader and the IC card, and the convenience due to the using of a portable IC card in small size.

Embodiment 4

Figure 6:
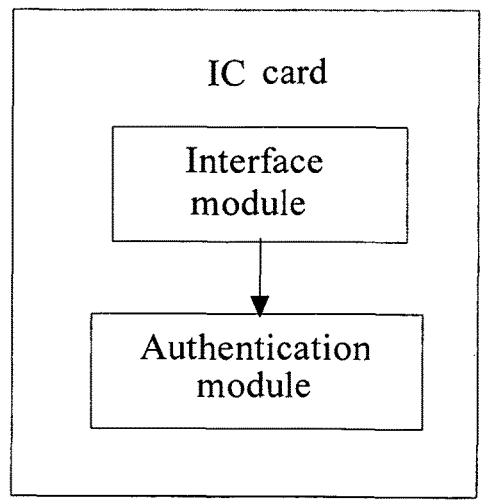
FIG. 6 is a schematic diagram of an IC card in the embodiment 4 of the invention.

As shown in FIG. 6, an IC card is provided in the embodiment 4 of the invention. The IC card may include an interface module adapted to establish a connection to a card reader; and an authentication module adapted to authenticate the card reader connected to the IC card or be authenticated by the card reader connected to the IC card.

The authentication module may include a first authentication unit adapted to store the data needed by the card reader for authenticating the IC card.

The authentication module may further include a second authentication unit adapted to authenticating the card reader.

The IC card may further include a storage module adapted to store the files for upgrading, and an encryption module adapted to encrypt the files for upgrading stored in the storage module.

The interface module may include a first interface unit adapted to establish a mechanical connection to the card reader to activate the IC card, or a second interface unit adapted to return an identification of the IC card to the card reader according to a card-searching instruction and an anti-collision instruction sent from the card reader.

The first authentication unit may include a first authentication subunit adapted to receive a first validation code generated and sent by the card reader, and return a first authorization code, for authenticating the IC card by the card reader, to the card reader according to the first validation code; or a second authentication subunit adapted to return status information, for authenticating the IC card by the card reader, to the card reader.

The storage module may include a storage unit adapted to store the files for upgrading at a preset address according to identifications of the files for upgrading.

The second authentication unit may include a third authentication subunit adapted to generate a second validation code and send it to the card reader, and adapted to receive the second authorization code generated and sent by the card reader and return status information, for determining by the card reader whether the IC card succeeds in authenticating the card reader, to the card reader.

Upgrading firmware of a card reader with the IC card of the embodiment 4, in which bin files for upgrading is stored, has the advantages of short cycle for development, lower cost, convenience for operation, high efficiency for upgrading, and a higher security by an authentication between the card reader and the IC card, and the convenience due to the using of a portable IC card in small size.

Embodiment 5

Figure 7:
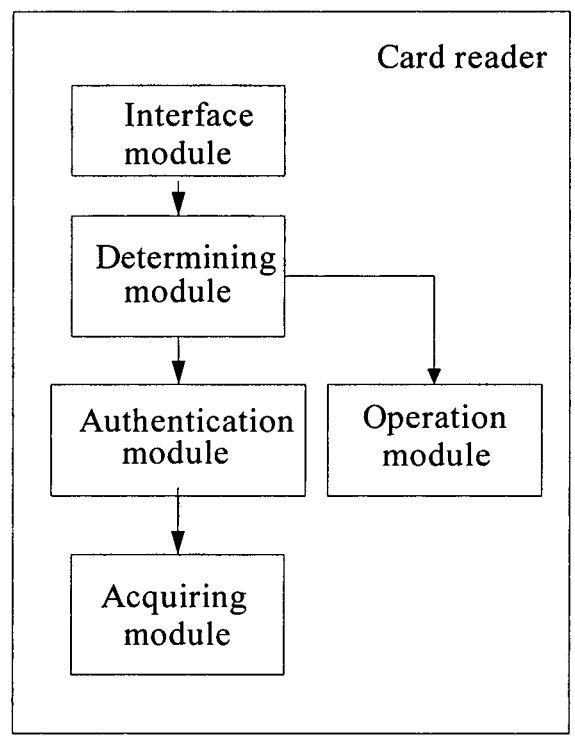
FIG. 7 is a schematic diagram of a card reader in the embodiment 5 of the invention.

As shown in FIG. 7, a card reader is provided in the embodiment 5 of the invention. The card reader may include: an interface module adapted to establish a connection to an Integrated Circuit (IC) card; a determining module adapted to determine whether the IC card is an IC card for upgrading; an authentication module adapted to establish the connection to the IC card and authenticate the IC card when a result of the determining by the determining module is positive; an operation module adapted to operate the IC card as normal if the determining module determines that the IC card is not an IC card for upgrading; an acquiring module adapted to acquire the files for upgrading from the IC card, and upgrade firmware of the card reader with the files for upgrading.

The authentication module may include an authentication unit adapted to authenticate the IC card for upgrading connected to it after the determining module determines the IC card is an IC card for upgrading.

The authentication module may further include a communication unit adapted to communicate with the IC card to enable the authentication to the card reader performed by the IC card.

The acquiring module may include an acquiring unit adapted to acquire files for upgrading according to the address in which the files are stored from the IC card after the authentication module makes mutual or one-way authentication with the IC card, and upgrade the firmware of the card reader with the files for upgrading.

The acquiring module may further include a validation determining unit adapted to determine whether the files for upgrading acquired are valid, and if they are, upgrade the firmware of the card reader with the files for upgrading.

The acquiring module may further include a decryption unit adapted to decrypt the encrypted files for upgrading when the files for upgrading is encrypted, and upgrade the firmware of the card reader with the decrypted files for upgrading.

Upgrading firmware of a card reader with the card reader of this embodiment 5 and an IC card, in which bin files for upgrading is stored, has the advantages of short cycle for development, lower cost, convenience for operation, high efficiency for upgrading, and a higher security by an authentication between the card reader and the IC card, and the convenience due to the using of a portable IC card in small size.

Persons in the art will appreciate that the drawings provided in the invention are merely exemplary diagrams illustrating some preferred embodiments in the invention, and some of the modules and/or steps in the drawings are not a must for the invention.

In addition, persons in the art will appreciate that the modules in the IC card and/or the card reader of the invention can be arranged according to the above embodiments of the invention, or may be located in one or more different devices in other embodiments in the invention. In other words, the modules/units as shown in the embodiments can be integrated into one module or can be divided into a plurality of sub-modules.

The numbers of the above embodiments in the invention are shown merely for the convenience of description, and should not be regarded as a reflection of the ranking of the above embodiments of the invention.

Part of the steps of the embodiments of the invention can be realized by software which can be stored in a storage medium such as a disc or hard driver and etc.

What is claimed is:

1. A method of upgrading firmware of a card reader, comprising steps of:
establishing a contact connection between the card reader and Integrated Circuit (IC) card;
determining, by a processor in the card reader, whether the IC card is one IC card for upgrading in which encrypted files for upgrading are stored on the IC card, by determining whether specific information on the IC card obtained through the contact connection to the IC card by the card reader matches information preconfigured in the card reader;
if the IC card is one IC card for upgrading, making, by the processor in the card reader and a processor in the IC card, mutual authentication between the card reader and the IC card;
acquiring, by the card reader, the encrypted files for upgrading and decrypting the encrypted files for upgrading after a successful mutual authentication between the card reader and the IC card, and
upgrading firmware of the card reader by using the decrypted files for upgrading; and wherein
the IC card is one contacting IC card and the card reader is a contacting card reader, and the step of determining by the processor in the card reader whether the IC card is the one IC card for upgrading comprises:
reading, by the card reader, feature information which is the specific information of the IC card sent by the IC card, and determining whether the feature information matches preset feature information which is the information preconfigured in the card reader, determining that the IC card is the one IC card for upgrading if the feature information matches the preset feature information, and determining that the IC card is not the one IC card for upgrading if the feature information does not match the preset feature information;
wherein the step of making by the processor in the card reader and the processor in the IC card mutual authentication with the IC card comprises steps of:
authenticating the IC card by the card reader;
authenticating the card reader by the IC card;
the step of acquiring by the card reader the encrypted files for upgrading from the IC card after a successful authentication between the card reader and the IC card comprises: acquiring, by the card reader, the encrypted files for upgrading from the IC card after the authenticating the IC card by the card reader succeeds and the authenticating the card reader by the IC card succeeds:
and the step of authenticating the IC card by the card reader comprises:
generating, by the card reader, a first valid code and sending the first validation code to the IC card;
generating, by the card reader, a first verification code according to the first validation code by using, by the card reader, the first validation code as the first verification code directly; or converting, by the card reader, the first validation code into the first verification code; or encrypting, by the card reader, the first validation code with a preset symmetrical key to obtain the first verification code: or encrypting, by the card reader, the first validation code with a preset asymmetrical key to obtain the first verification code;
reading, by the card reader, a first authorization code generated according to the first validation code by the IC card; and
determining, by the card reader, whether the first authorization code matches the first verification code, and determining that the card reader succeeds in authenticating the IC card if the first authorization code matches the first verification code, determining that the authenticating the IC card by the card reader fails if the first authorization code does not match the first verification code reading, by the card reader, a second validation code generated by the IC card, and generating a second authorization code according to the second validation code and sending the second authorization code to the IC card; and reading, by the card reader, status information returned by the IC card after receiving the second authorization code, and determining whether the status information is the same as preset information which is the information preconfigured in the card reader, determining, by the card reader, that the IC card succeeds in authenticating the card reader if the status information is the same as the preset information, deyermining that the authenticating the card reader by the IC card fails if the status information is not the same as the preset information.

2. The method of claim 1, wherein the step of acquiring by the card reader the encrypted files for upgrading from the IC card comprises: acquiring, by the card reader, the encrypted files for upgrading from the IC card according to a preset address in which the files for upgrading are stored.

3. The method of claim 1, wherein before the step of upgrading the firmware of the card reader with decrypted files for upgrading, the method further comprises a step of:

determining, by the card reader, whether the decrypted files for upgrading are valid, and if they are, upgrading, by the card reader, the firmware with the decrypted files for upgrading acquired.

4. The method of claim 3, wherein the step of determining by the card reader whether the decrypted files for upgrading are valid comprises: determining, by the card reader, whether the decrypted files for upgrading are valid according to a checksum of the files for upgrading.

* * * * *